United States Patent
Peczalski et al.

(10) Patent No.: US 8,344,941 B2
(45) Date of Patent: Jan. 1, 2013

(54) RELATIVE VIBRATION MEASUREMENT

(75) Inventors: Andy Peczalski, Eden Prarie, MN (US);
Steve D. Huseth, Plymouth, MN (US);
Gary Richard O'Brien, Jr., Riverview, MI (US)

(73) Assignee: Honeywell International Inc., Morristown, NJ (US)

( * ) Notice: Subject to any disclaimer, the term of this patent is extended or adjusted under 35 U.S.C. 154(b) by 348 days.

(21) Appl. No.: 12/690,657

(22) Filed: Jan. 20, 2010

(65) Prior Publication Data
US 2011/0175768 A1    Jul. 21, 2011

(51) Int. Cl.
*G01S 13/58* (2006.01)
(52) U.S. Cl. .......................... 342/106; 342/104; 342/114
(58) Field of Classification Search ........... 342/104–117
See application file for complete search history.

(56) References Cited

U.S. PATENT DOCUMENTS

| | | | |
|---|---|---|---|
| 6,337,653 B1 * | 1/2002 | Buchler et al. | 342/72 |
| 2005/0265124 A1 * | 12/2005 | Smith | 367/128 |
| 2006/0175464 A1 * | 8/2006 | Chang | 244/3.19 |

* cited by examiner

*Primary Examiner* — Timothy A Brainard
(74) *Attorney, Agent, or Firm* — Schwegman, Lundberg & Woessner, P.A.

(57) ABSTRACT

A method of detecting motion in a load bearing member on a machine. The method includes positioning a Doppler radar detector on the machine and orienting the Doppler radar detector such that the Doppler radar detector floods the load bearing member transmitted radio frequency signals. The method further includes receiving reflected radio frequency signals from the load bearing member with an antenna and generating intermediate frequency signals based on differences between the transmitted radio frequency signals and the reflected radio frequency signals. The method further includes measuring the intermediate frequency signals.

12 Claims, 1 Drawing Sheet

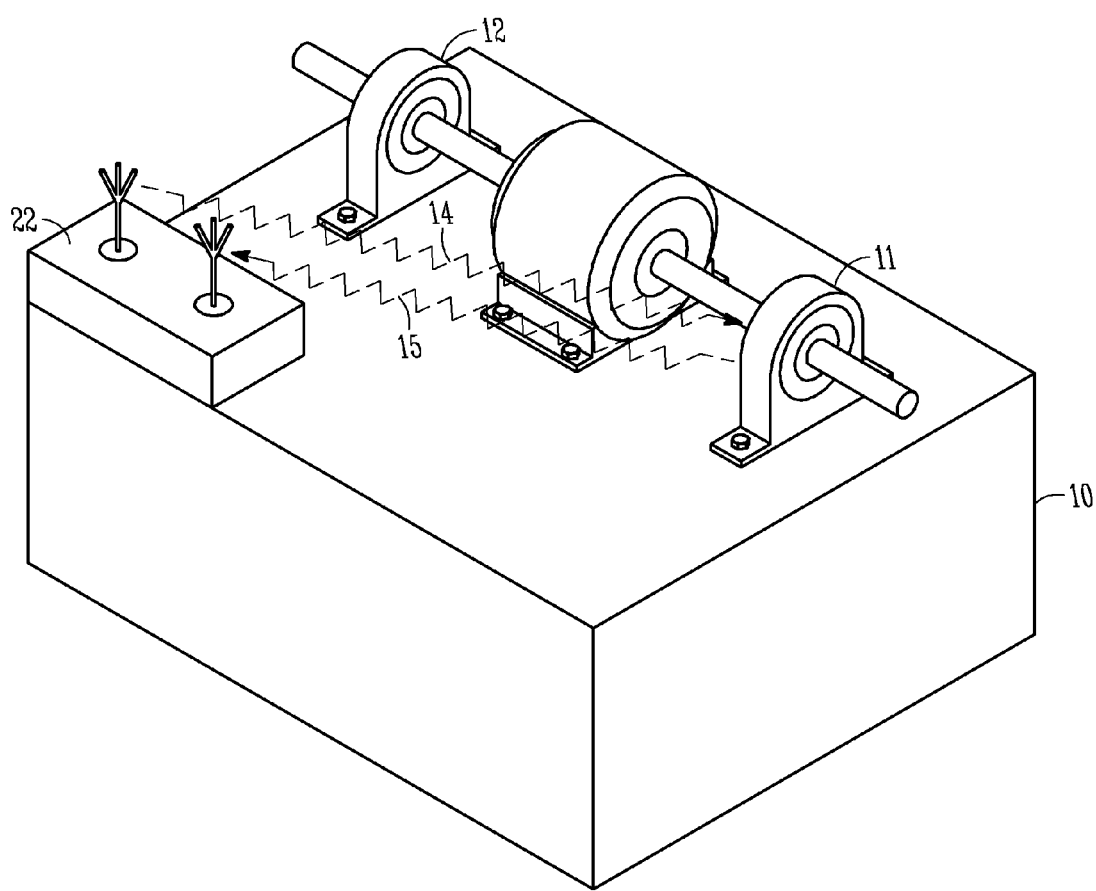

RELATIVE VIBRATION MEASUREMENT

BACKGROUND

The size, type and location of motions within structures (e.g., operating machinery) may provide an indication as to the relative health of the structure and may be used for predictive maintenance of the structure. One technique for analyzing moving components involves sensing motion (i.e., displacement, vibration and/or acceleration) of one or more of the components on the structures.

Many different types of instruments and systems have been developed for both monitoring and nondestructively testing structures, materials, devices and machines used for manufacturing processes. As examples, nondestructive testing is done on moving parts within machines that are used in refineries, power generators, aircraft, oil platforms, paper mills, and structures (bridges, cranes, etc.) in order to monitor the condition of those items.

Sensors have also been used for quality control in manufacturing operations and in research applications involving moving composite structures (e.g., those machines as fiberglass, reinforced plastics and advanced aerospace materials). In addition, sensors have been used as an effective indirect method for monitoring tool condition in machining operations.

BRIEF DESCRIPTION OF THE DRAWINGS

FIG. 1 is an example arrangement of items that may be used in a method of detecting motion in a component that forms part of a structure.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An example arrangement of items that may be used in a method of detecting motion in a component 11 that forms part of a structure 10 is described herein with reference to FIG. 1. The method includes positioning a Doppler radar detector 22 on the structure 10 and orienting the Doppler radar detector 22 such that the Doppler radar detector 22 floods the component 11 with transmitted radio frequency signals 14. The method further includes receiving reflected radio frequency signals 15 from the component with an antenna 16 and generating intermediate frequency signals based on differences between the transmitted radio frequency signals 14 and the reflected radio frequency signals 15. It should be noted that radio frequency signals as used herein refers to variety of different types of signals (e.g., microwave radar signals).

The method further includes measuring the intermediate frequency signals. The intermediate signal signals may be analyzed to provide information about the motion of the component 11 relative to the structure 10. As an example, a regression relationship may be established between component 11 movement velocity and displacement and the amplitude or frequency of the intermediate frequency signals. Using the established regression relationship, component 11 movement parameters like displacement, velocity and acceleration can be projected.

Movement of the component 11 with respect to the movement of the structure 10 can be determined by utilizing the method. As an example, the component 11 may be vibrating significantly less than the common vibration of the structure 10 and component 11. Therefore, the method detects the vibration of the component 11 independently of the common mode vibration of the component 11 and the structure 10. Movement sensing by other methods that are not differential e.g. accelerometer would only show the common mode vibration which would mask the independent vibration of component 11.

Several characteristics make a microwave Doppler radar detector 22 attractive for detecting motion. The Doppler radar detector 22 may be relatively inexpensive when compared to other monitoring equipment and no contact is necessary between the Doppler radar detector 22 and the components to be monitored. One Doppler sensor could monitor wide field of view versus the existing contact sensors (e.g. accelerometers that sense the vibration at the point of attachment only). In addition, the signal processing methods for Doppler radar signals are relatively simple.

In some embodiments, the Doppler Radar detector 22 may be built from a linear array of Doppler sensors each fed by separate horn antenna with a narrow beam width (e.g. 10 degrees). In addition, a linear array radar antenna may be maneuvered with mechanical gimbals to obtain a 2-dimensional map of vibrations. Other embodiments may utilize an electronically scanned phase array antenna.

The method may further include filtering the intermediate signals to isolate signals associated with motion of the component 11 (e.g., with a filter). As discussed above, the intermediate signals are the difference between the transmitted radio frequency signals 14 and the reflected radio frequency signals 15. The filter may filter out lower frequency signals in the intermediate frequency signals to produce filtered intermediate signals.

In one example embodiment, the filter removes frequencies less than 1 kHz. The filter may also amplify certain signals corresponding to certain desired motion detecting characteristics. In addition, when the filtered intermediate signals are sent to a computer (one preferred embodiment of data collection and analysis) for subsequent digital processing, the filter may also remove very high frequencies necessary to prevent aliasing. As an example, filtering the intermediate signals to isolate signals associated with motion of the component 11 may include removing signals unless the signals are in the 1-10,000 Hz range. It should be noted that some or all of the filters may be low pass, high pass and notch types as well as fast Fourier transforms that divide a signal in small intervals around particular frequencies. As used herein, filtering also refers to all signal processing or signal conditioning functions/operations.

In some embodiments, orienting the Doppler radar detector 22 such that the Doppler radar detector 22 floods the component 11 with transmitted radio frequency signals 14 may include transmitting the radio frequency signals 14 with a transmitting portion of the antenna. In addition, receiving reflected radio frequency signals 15 from the component 11 with an antenna may include receiving the reflected radio frequency signals 15 with a receiving portion of the antenna. Although FIG. 1 shows antenna 16 as being formed of a transmitting portion and a receiving portion, it should be noted that the antenna may be formed of a single portion that transmits and receives signals.

Depending on the application where the method is utilized, measuring the intermediate frequency signals will include determining motion of the component 11 based on the set of intermediate signals. As examples, determining motion of the component 11 based on the intermediate signals may include (i) determining the displacement of the component 11 with respect to the position of the antenna as a function of time based on the amplitude of the intermediate signals when the displacement is substantially smaller than the wavelength of the RF signal (e.g. 10% of wavelength); and/or (ii) determining velocity of component 11 based on the frequency of the intermediate signals; and/or (iii) calculating the velocity and acceleration of the component 11 by single or double differentiation of the amplitude with respect to time respectively.

In some embodiments, determining motion of the component 11 based on the on the set of intermediate signals may include determining displacement of the component 11 relative to the structure 10. It should be noted that in other embodiments, different types of types of relative motion may be determined for the component 11 relative to the structure 10. As examples, the vibration, velocity, acceleration and may be determined for the component 11 relative to the structure 10.

The Doppler radar detector 22 can be used to detect motion in a variety of components that form part of a variety of structures. The intermediate signals will characteristically change as the motion of the component 11 changes relative to the structure 10.

In the illustrated example embodiment, the structure 10 is a machine that includes a motor, and the component 11 is a load bearing member (e.g., a bearing) that supports a shaft which is driven by the motor. It should be noted that other types of structures and/or load bearing members may be monitored by the method. Some example structures include a wind turbine mast and wing. Usually the mast movement will be imparted on the wing as the common mode vibration. However, the wing may also have a vibration that is independent of the swaying of the mast. Another example may be a flywheel motion with respect to the motion of the flywheel mounting axis or base. Some example load bearing members include gears in a transmission box, suspension of a ground vehicle and a wing of an aircraft.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of detecting motion in a component that is part of a structure, the method comprising:
   positioning a radar detector on the structure;
   orienting the radar detector such that the radar detector illuminates the component with transmitted radio frequency signals;
   receiving reflected radio frequency signals from the component with an antenna;
   generating intermediate frequency signals based on differences between the transmitted radio frequency signals and the reflected radio frequency signals;
   measuring the intermediate frequency signals; and
   analyzing the intermediate frequency signals to establish a regression relationship between the component movement and at least one of the amplitude or frequency of the intermediate frequency signals.

2. The noncontact motion sensor of claim 1, wherein positioning a radar detector on the structure includes positioning a Doppler radar detector on the structure.

3. The method of claim 1 further comprising filtering the intermediate signals to isolate signals associated with motion of the component.

4. The method of claim 3 wherein filtering the intermediate signals to isolate signals associated with motion of the component includes removing signals unless the signals are in the 1-10,000 Hz range.

5. The method of claim 3 wherein filtering the intermediate signals to isolate signals associated with motion of the component includes using a fast Fourier transform which splits signals in narrow bands of frequencies.

6. The method of claim 3 wherein filtering the intermediate signals to isolate signals associated with motion of the component includes filtering the intermediate signals received from the first antenna with a filter.

7. The method of claim 2 wherein orienting the Doppler radar detector such that the Doppler radar detector floods the component with transmitted radio frequency signals includes transmitting the radio frequency signals with a transmitting portion of the antenna.

8. The method of claim 7 wherein receiving reflected radio frequency signals from the component with the antenna includes receiving the radio frequency signals with a receiving portion of the antenna.

9. The method of claim 1 wherein measuring the intermediate frequency signals includes determining motion of the component based on the intermediate signals.

10. The method of claim 9 wherein determining motion of the component based on the intermediate signals includes determining motion based on the amplitude of the intermediate signals.

11. The method of claim 9 wherein determining motion of the component based on the intermediate signals includes determining motion based on the frequency of the intermediate signals.

12. The method of claim 9 wherein determining motion of the component based on the intermediate signals includes determining displacement of the component relative to the structure.

* * * * *